March 22, 1927.  
B. J. MINNIER ET AL  
1,621,944  
TRIPLE VALVE  
Filed May 2, 1925  
8 Sheets-Sheet 8

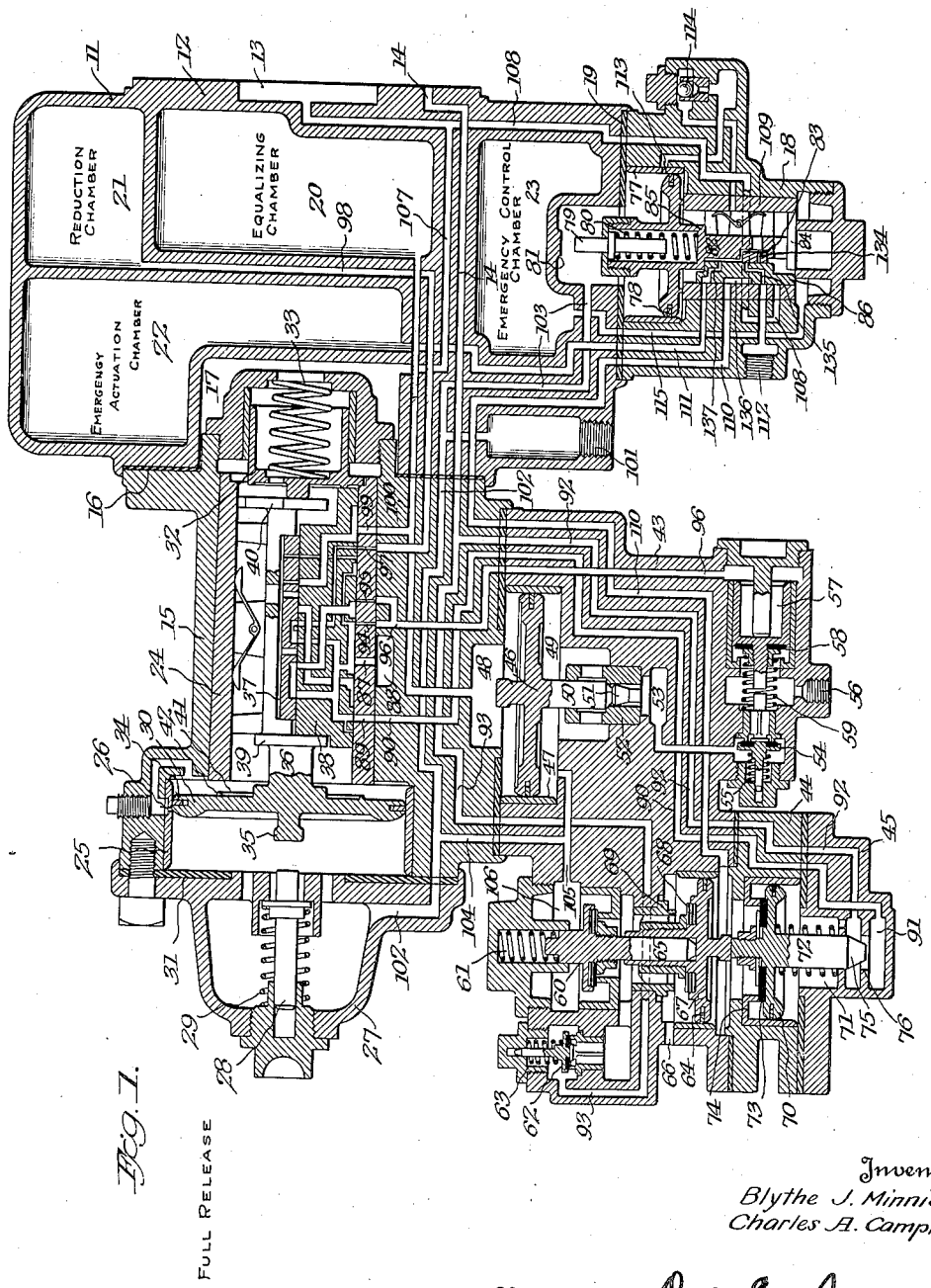

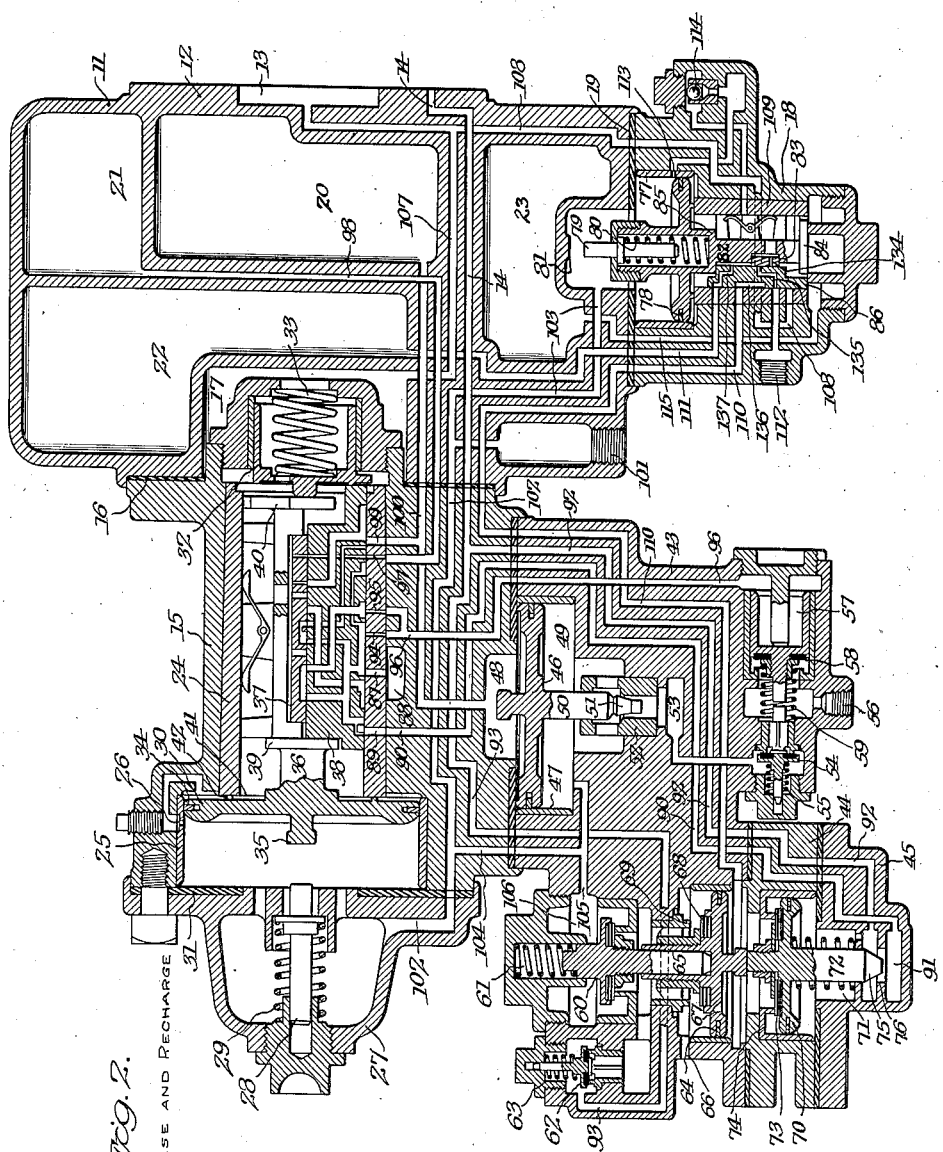

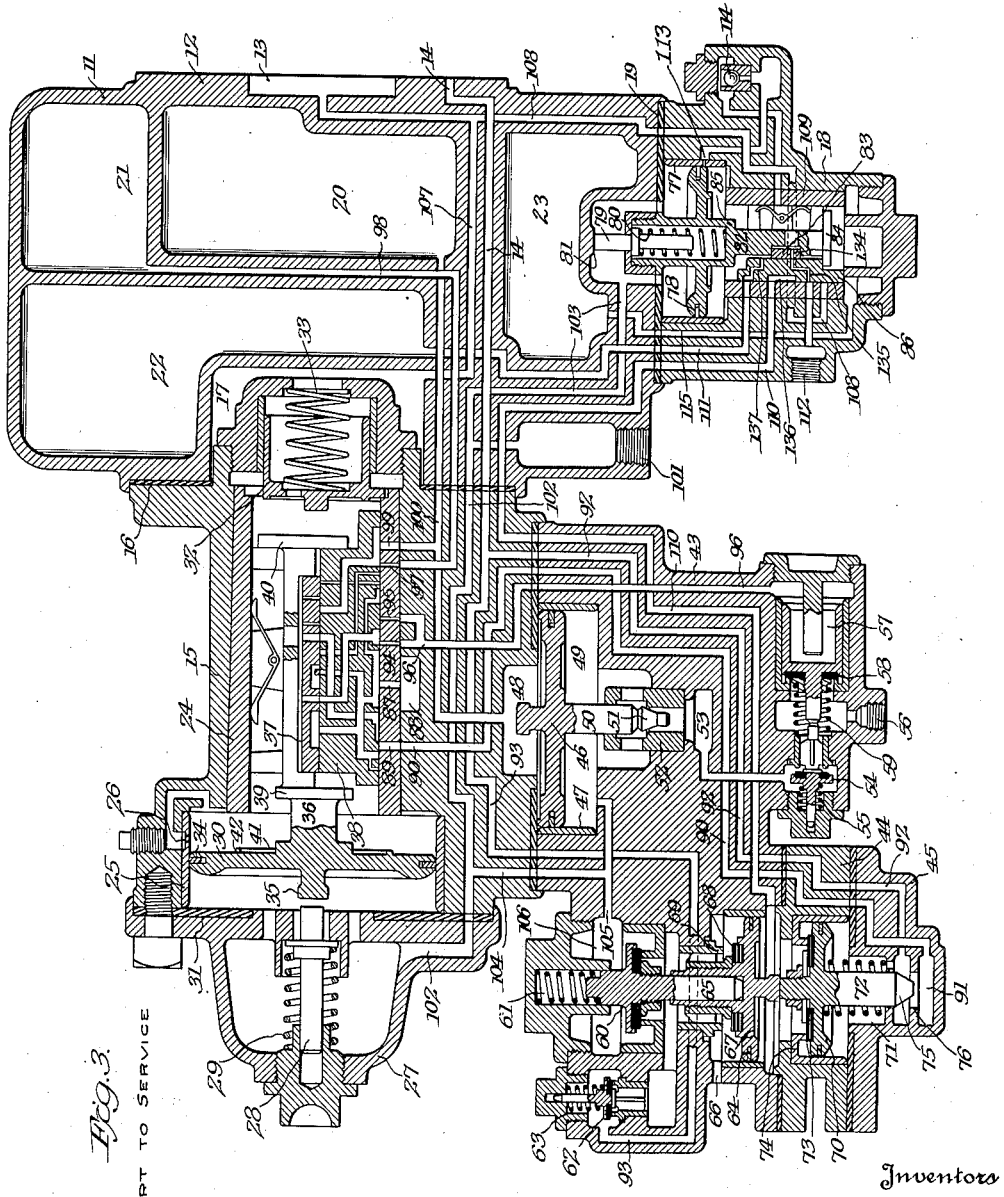

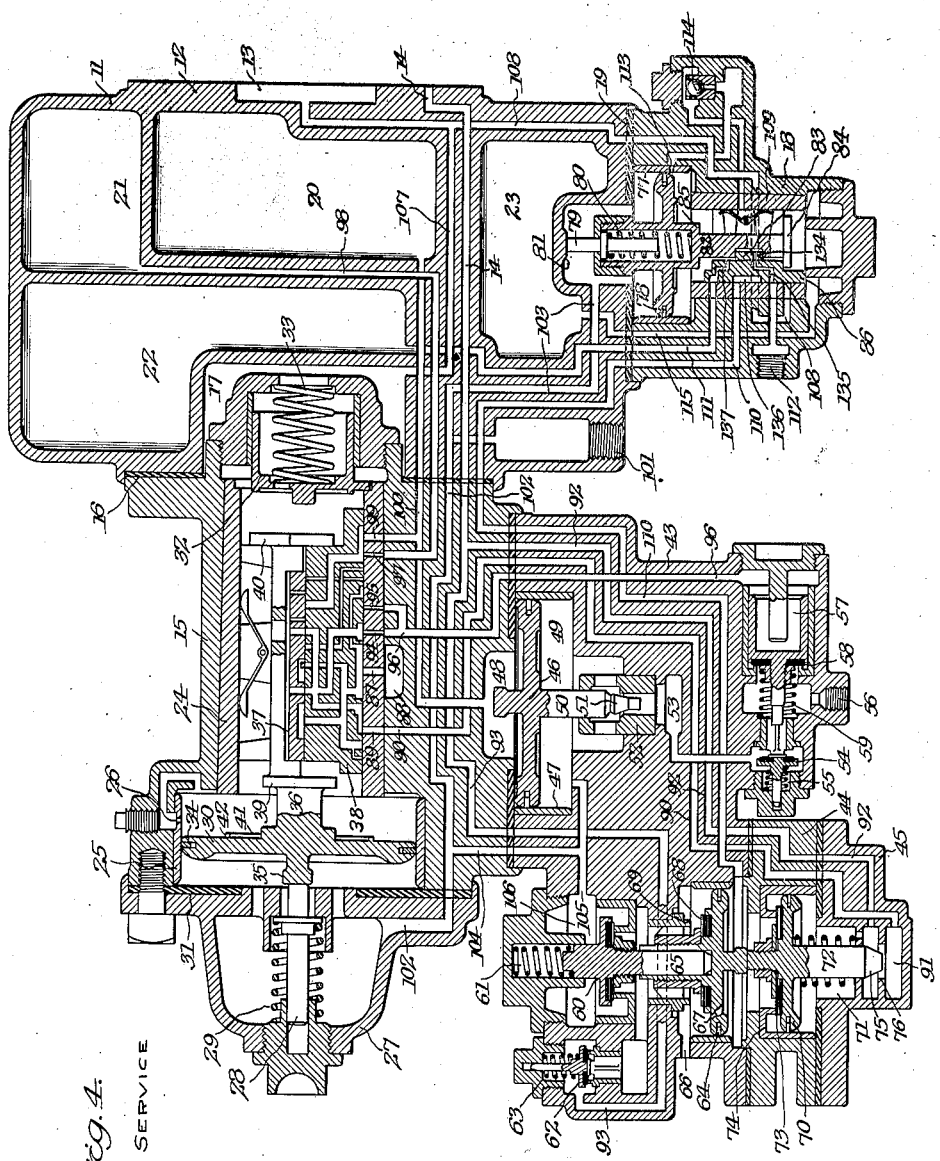

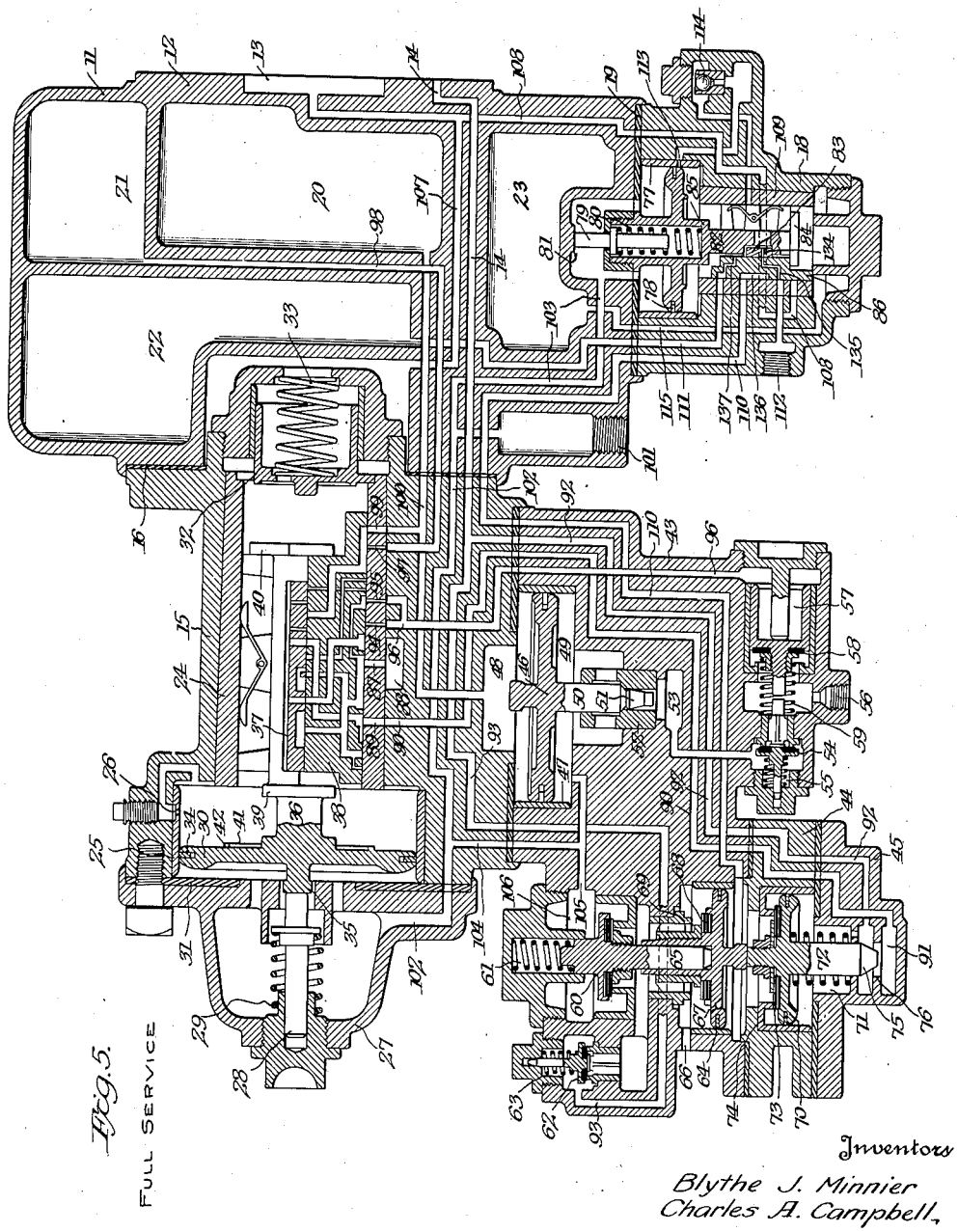

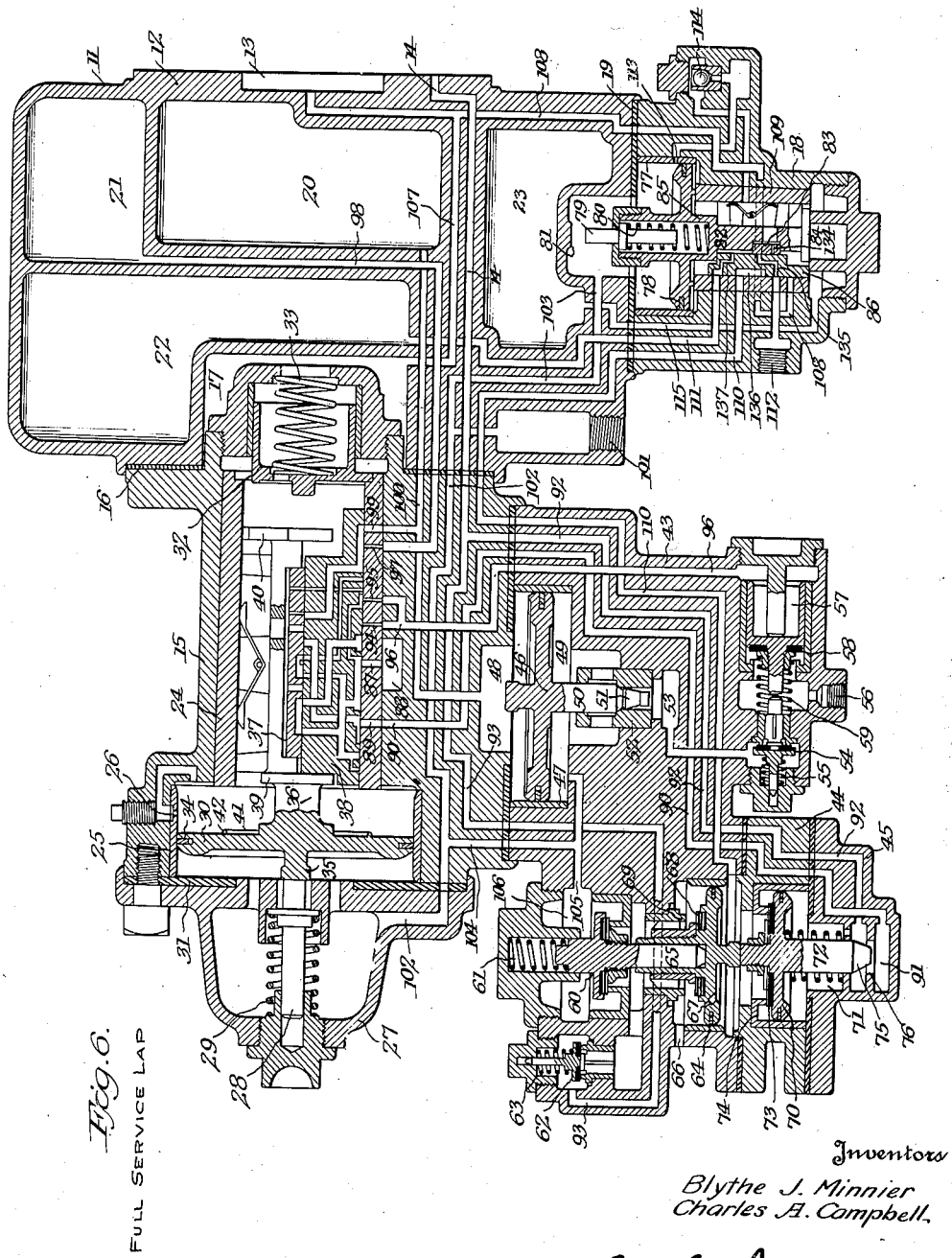

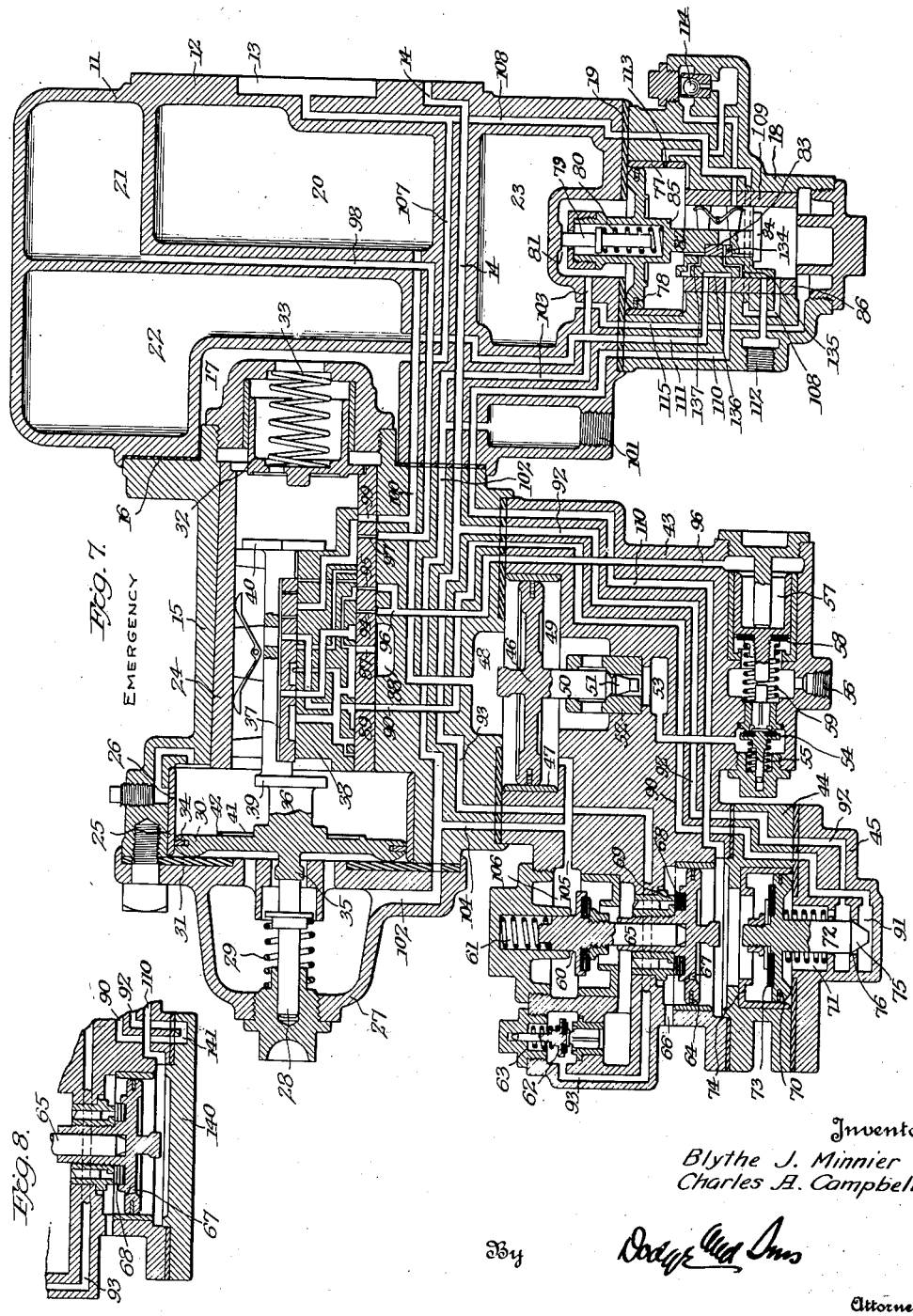

Inventors  
Blythe J. Minnier  
Charles H. Campbell,  
By  
Attorneys

Patented Mar. 22, 1927.

1,621,944

UNITED STATES PATENT OFFICE.

BLYTHE J. MINNIER AND CHARLES A. CAMPBELL, OF WATERTOWN, NEW YORK; SAID CAMPBELL ASSIGNOR TO THE NEW YORK AIR BRAKE COMPANY, A CORPORATION OF NEW JERSEY.

TRIPLE VALVE.

Application filed May 2, 1925. Serial No. 27,472.

This invention relates to a method of controlling the action of automatic air brake systems including triple valves, and to a triple valve operating according to said method and presenting a number of features of novelty.

The type of triple valve familiar in the art and generally known as the "K—2 triple" embodies the characteristics known in the art as quick serial action in service, restricted recharge, and restricted release. Quick serial action in service is secured by causing the triple valve to vent from the brake pipe a small amount of air as the valve moves to service application position, the purpose being to accelerate the propagation of the pressure reduction in the brake pipe from the engine to the rear end of the train.

Restricted release is secured by a slight over travel in releasing direction of the triple valves at the front end of the train, so that the release of the brakes at the front end of the train is checked until the releasing pressure rise can be propagated substantially throughout the length of the brake pipe, the purpose being to prevent the slack from running out at the front end of the train while the brakes at the rear end of the train remain applied.

Restricted recharge is also accomplished by over travel of the triple valves at the front end of the train, the purpose being to prevent the auxiliary reservoirs at the front end of the train from absorbing all the air which can be fed through the brake pipe, as they could otherwise do. The effect of restricted recharge is to increase the speed of propagation of the releasing pressure wave throughout the length of the brake pipe and assure the commencing of the releasing function throughout the entire length of the train approximately simultaneously.

It will be observed that these prior efforts to secure simultaneous action throughout the length of the train involve secondary functions in the triple valve which, once they are initiated, tend to continue without direct control by the engineer's brake valve. As the length of trains increases, the effectiveness of existing mechanisms is outrun, and in trains of lengths now common it is necessary to give the quick service vent such small capacity that its action is very slight. Otherwise severe re-applications occur as the result of over-charged auxiliary reservoirs at the front of the train.

The conditions which impose this limitation have their origin in the releasing and recharging function. Although the restricted recharge feature does expedite the propagation of the release pressure wave through the brake pipe, the brake pipes are now so long that, before release and recharge has occurred completely throughout the train, some auxiliary reservoirs at the front of the train are almost inevitably over-charged. Consequently, when the engineer shifts his brake valve from release to running position, an undesired re-application occurs on the cars at the front end of the train. This application includes venting of air from the brake pipe by the means designed to secure quick serial action, and this venting has the effect of increasing the intensity of the undesired application and of causing it to extend back through the train farther from the engine than it would otherwise do. It follows that the brakes on some cars whose auxiliary reservoirs are not actually over-charged reapply.

To overcome this difficulty, the expedient of reducing the local discharge in service has been generally adopted, and the demands on the system are so severe that quick serial venting of the brake pipe has been reduced in practice to an almost negligible point, thus depriving the system as a whole of most of the advantage of quick serial venting.

An important feature of the present invention is a new and improved type of quick service vent so contrived that in service such vent does not open or at any rate does not open for so long in any triple valve whose reservoir is overcharged. Generally stated, this result is accomplished by placing the service vent under the control of an equalizing piston and valve not unlike the equalizing discharge valve used in standard forms of engineers' brake valves. The piston is subject in vent-opening direction to brake pipe pressure, and in vent-closing direction to pressure in a chamber which is called the "equalizing chamber". This is charged during release to the same pressure as the auxiliary reservoir. If the triple valve starts to service application position after a normal, as contradistinguished from a restricted recharge operation, the pressure in the equalizing chamber is allowed to equalize with the pressure in a so-called reduction chamber which, under these conditions, is at atmospheric pressure. The volumes of the equalizing chamber and the reduction chamber are so related that under these conditions a service reduction (say about seven pounds) above the equalizing discharge piston is produced, and the service vent is opened.

On the other hand, if during the charging operation the triple valve has moved to restricted recharge position, then the reduction chamber as well as the equalizing chamber is charged with the same pressure as the auxiliary reservoir, or at some pressure between this and atmospheric. Consequently, when the triple valve starts to service application position, the equalizing chamber and the reduction chamber are at or near the same pressure, and when they are connected, the pressure drop above the equalizing piston is zero or at any rate less than it would be under the conditions previously described.

Hence the equalizing piston which controls the service vent either remains closed or else opens and then closes much more quickly than it would do under the conditions previously described. From this it follows that an undesired re-application, caused by overcharging the reservoirs at the front of the train, is not accompanied by venting of the brake pipe. Consequently, the tendency to re-apply is not exaggerated and the quick service feature does not have the effect of increasing the re-application tendency.

The structure forming the subject matter of the present application is so contrived that the release of the undesired re-application can be readily and quickly effected, and the quick service vent gradually restored to normal operative condition.

Another feature illustrated in the present application but not herein claimed, resides in providing an emergency valve mechanism which is actuated directly from the brake pipe and which is not under the primary control of the triple piston. The emergency valve mechanism operates to admit brake pipe air directly to the cylinder. This valve mechanism is controlled by a piston which is subject to brake pipe pressure on one side and to pressure fluid confined in a control chamber. There is also a closely related emergency actuation chamber which in emergency application furnishes motive fluid to actuate the emergency valve. Under service reduction conditions these two chambers are vented at a rate commensurate with the service rate of brake pipe reduction. Consequently, if brake pipe pressure is reduced at the proper service rate, the vent valve mechanism assumes a neutral position, but is always ready to produce an emergency application if brake pipe pressure is reduced faster than the normal service rate.

A third feature of the valve illustrated, but not herein claimed, and one which may or may not be used with the other features just described, is a retarding device which may shut off or may throttle (according to the proportions of its parts) the flow of auxiliary reservoir air to the brake cylinder for a period sufficient to permit all the valves in the train to respond and to admit brake pipe air to the cylinders before the auxiliary reservoir air is admitted. The duration of such stopping or throttling action is controlled by the size of a single port, and for trains of the present length is preferably set at about 7 seconds. This last named feature is one of greatest importance in long trains, for if the full emergency application be immediately produced in the front of the train, in very long trains, and particularly at low train speeds, the slack in the train will run in and cause buckling of the train or severe shocks and injury to the rolling stock and lading. This action is accomplished by a time vent piston mechanism which is subject to the control of the emergency control valve and which acts only in emergency applications temporarily to close or throttle the brake cylinder port.

The features outlined in the preceding two paragraphs, and not here claimed are claimed in a copending application of Charles A. Campbell, Serial No. 112,109, filed May 27, 1926.

Another feature of the invention is the designing of the valve in such a manner that the under side of the main triple slide valve is never subjected to brake pipe pressure, and hence is not damaged by grit and scale blown beneath the valve.

The advantages of the improved triple valve may be briefly recapitulated as follows:

Rapid serial action in long trains can be secured in service application by more intense local venting than has heretofore been practicable with trains of the same length.

The emergency function is not initiated by the main triple piston nor is it under the control of opposed auxiliary reservoir and brake pipe pressures, but is solely dependent on the rate of brake pipe pressure reduction. Consequently, undesired emergency applications are less likely to occur.

The automatic elimination of the local brake pipe venting in those triple valves which have moved to restricted recharge position confines the application to those units whose reservoirs have actually been overcharged. When the overcharge is dissipated the venting function is restored.

The automatic retardation of the admission of auxiliary reservoir air in emergency permits the bunching of the slack before the maximum brake cylinder pressure is obtained in the forward cars.

The slide valve mechanism is not subjected to contact with grit blown from the brake pipe in emergency applications.

In the accompanying drawings there is illustrated a practical embodiment of the invention. These drawings are diagrams designed to bring all the ports and passages into the same plane so that their simultaneous functions may be observed. This requires some distortion of proportions, for obviously the parts can be more compactly arranged if desired. The drawings, however, show all the parts and their operative relations and permit the functions of the various parts and the inter-relation of such functions to be readily traced. In the drawings—

Fig. 1 is a longitudinal diagrammatic section of the complete triple valve including certain special chambers characteristic of this invention. The auxiliary reservoir, the brake cylinder and the brake pipe are not illustrated, since their form does not differ from standard practice. Their points of connection alone are illustrated. In Fig. 1 the parts are shown in full release position.

Fig. 2 is a similar view showing the parts in restricted release and recharge position.

Fig. 3 is a similar view showing the parts in the positions they assume when the triple piston is starting to service position. This view shows the parts as they would appear after a normal recharge, the equalizing piston being up and the brake pipe vent being open. If the application started immediately after a restricted recharge, then the parts would be in the same position except that the equalizing piston would be down and the brake pipe vent would be closed thereby.

Fig. 4 is a similar view showing the valve in quick service position with the brake pipe vent flow continuing.

Fig. 5 is a similar view showing the parts in full service position, the equalizing piston having moved downward and closed the brake pipe vent.

Fig. 6 is a similar view showing the parts in the lap position which they assume after a full service application.

Fig. 7 is a similar view showing the parts in emergency position. In this view the first stage of emergency application is illustrated; i. e., that in which brake pipe air is being fed to the brake cylinder while the flow of auxiliary reservoir air is delayed or stopped by the build-up delay valve.

Fig. 8 is a fragmentary view showing how a single cover may be substituted for the build-up delay cylinder and piston in valves where the build-up delay feature is not desired.

Figure 9:
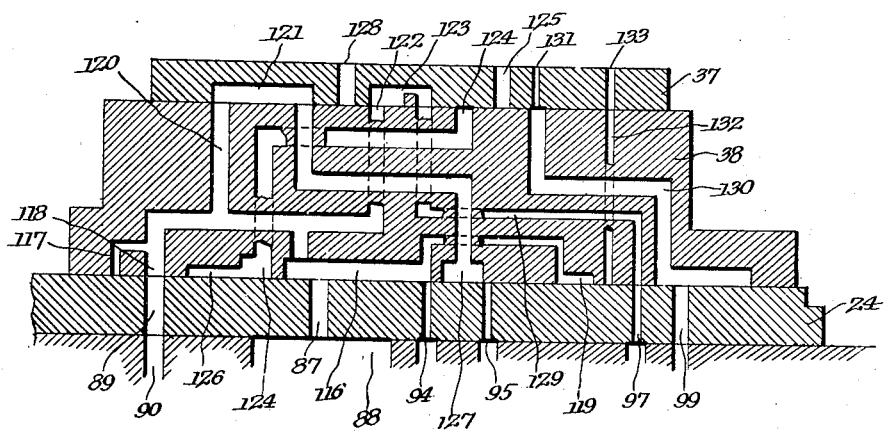
Fig. 9 is an enlarged section of the main slide valve and graduating valve in the position of Fig. 1.
Figure 10:
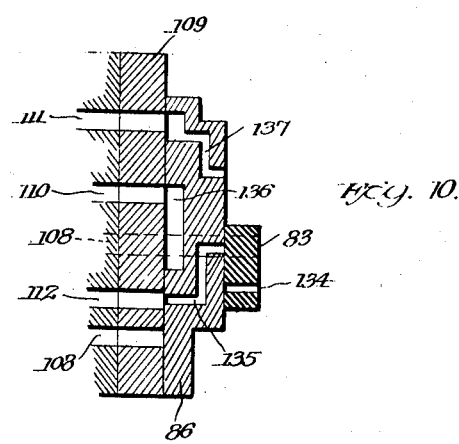
Fig. 10 is an enlarged section of the slide valve and riding valve actuated by the emergency control piston, the parts being shown in the position of Fig. 1.

The device is supported upon a bracket structure 11 which is formed with a plurality of chambers, hereinafter described, and a plurality of ports communicating to said chambers, but which contains no moving parts. This bracket 11 is formed with a number of ported faces against which the triple valve body, the emergency control valve body, and the auxiliary reservoir with its attached brake cylinder are mounted. The face 12 receives the auxiliary reservoir which, as usual, carries a port leading to the brake cylinder. The port in the bracket 11 communicating with the auxiliary reservoir is shown at 13 and the port communicating with the brake cylinder is shown at 14. The body 15 of the triple valve is clamped against the face 16 and a portion of the mechanism of the triple valve extends into a recess 17 formed in this face. The body 18 of the emergency control valve structure is mounted on the lower face 19 of the bracket 11.

There are a number of ports extending continuously through the body 15 of the triple valve and the bracket 11, but as these are clearly shown in the drawing the ports will be referred to simply by a single reference numeral in a general description of the port structure hereinafter given, and reliance will be placed on the drawing to indicate their path through the various assembled parts of the complete device.

The bracket 11 contains an equalizing chamber 20 which in release and recharge position, whether this be full or restricted, is charged to the same pressure as the auxiliary reservoir. The bracket 11 also contains a smaller chamber 21 known as the reduction chamber. In full release this chamber is connected through a restricted port with the atmosphere and hence gradually assumes atmospheric pressure. In restricted release and recharge, this chamber 21 is charged to the same pressure as the auxiliary reservoir. These two chambers conjointly control the equalizing piston which determines the action or inaction of the brake pipe vent. If when the valve is in release position the reduction chamber is at a lower pressure than the equalizing chamber and the valve starts to service position (see Fig. 3), these two reservoirs are connected together and their pressure equalizes at an intermediate pressure, which causes the brake pipe vent to remain open until brake pipe pressure has been lowered to the said intermediate pressure. If the chambers 20 and 21 are at the same pressure, the brake pipe vent valve cannot open.

The bracket 11 contains a third chamber 22, known as the emergency actuation chamber because it furnishes a supply of pressure fluid to open the emergency valve when the brake pipe pressure is reduced at an emergency rate.

The bracket 11 contains a fourth chamber 23, known as the emergency control chamber. This provides a confined volume of pressure fluid arranged to act against one side of the emergency control piston so that in opposition to brake pipe pressure it assists in producing the necessary movements of the emergency control piston under charges of brake pipe pressure.

The triple valve body 15 conforms quite closely to standard practice except as to details of the triple valve and graduating valve which are necessarily specially ported. The body 15 has the usual valve-chamber bushing 24, cylinder bushing 25, feed port 26, front cap 27, graduating stem 28, graduating spring 29, triple piston 30, piston gasket 31, piston retard stop 32, and retard spring 33. The triple piston 30 is provided with the usual packing ring 34 and graduating button 35. The rod 36 of the piston confines and positively moves a graduating valve 37 mounted in a recess formed in the rod 36 to receive it. It also shifts with certain lost motion between the rod and the valve a main triple slide valve 38, the valve 38 being engaged by two spaced lugs or spiders 39 and 40 formed on the rod 36.

The piston 30 has on its right hand face a rib or annular boss 41 which collides with the left hand end of the bushing 24 and which is interrupted for a short distance at 42 to form a feed port through which feed to the auxiliary reservoir occurs in restricted recharge position. In full release and recharge position the piston 30 stands slightly to the right of the port 26 and air flows through this port around the piston. If the piston is forced further to the right to restricted release and recharge position (Fig. 2), then the rib 41 seats against the end of bushing 24 and the entire feed must pass through the narrow groove 42. This produces the restricted recharge which occurs at the front end of the train as an incident to heavy releasing pressure wave in the brake pipe. The motion from full release to restricted release position is made against the opposition of the retard spring 33 which restores the parts to full release position when it is not overpowered by the preponderance of brake pipe pressure over auxiliary reservoir pressure. The triple valve parts so far described do not differ in any important respects from known types of retarded recharge and release triple valves.

Mounted on the lower side of the triple valve body 15 is a structure made up of a main section 43, and emergency build-up delay cylinder section 44 and an emergency build-up delay valve section 45. In the upper part of this is an equalizing piston 46 which in its uppermost position seals against the cylinder bushing 47 and separates two chambers, an upper chamber 48 which is the controlling chamber, and a lower chamber 49 which is called the brake pipe pressure chamber because it is in direct communication with the brake pipe. The piston 46 carries an equalizing discharge valve 50 whose pilot 51 is formed in the same general manner as are the pilots of equalizing discharge valves used in engineers' brake valves. This valve 50 and its stem 51 work in a bushing 52 and control a passage 53 leading to the quick service exhaust check 54. This check is held closed by a spring 55 and closes against flow from the passage 53 to the quick service discharge port 56. The quick service exhaust check 54 may be forced open and held open by an opposing quick service exhaust piston 57 which is provided with a sealing gasket 58 and which normally is held in retracted position by a spring 59.

While the valve 50, 51 controls the brake pipe vent during start to service and quick service, it is occasionally unseated for certain periods during recharge. Accordingly the check 54 and its actuating piston 57 are required as a secondary control to close the port 53 at all times except during the start to service and the quick service functions. To the left of the equalizing piston 46 is the brake pipe check 60 which is normally held closed by a spring 61 and which is urged closed by brake pipe pressure. This is the valve through which brake pipe air is fed to the brake cylinder in emergency operations, and to prevent its being forced open when brake cylinder pressure exceeds brake pipe pressure, it has associated with it a reversely arranged check vlave 62 which is known as the brake cylinder check valve and which is urged in a closing direction by spring 63.

The brake pipe check 60 is arranged to be forced open by the collision of the emergency actuating piston 64 which collides with the stem 65 of the brake pipe check 60 when the piston is forced upwardly by means hereinafter described. The space above the emergency actuating piston 64 is in direct communication with the atmosphere by means of a port 66 and it is provided with a through port 67 which is the timing means used to control the build-up delay in emergency actions. The piston 64 is provided on its upper face with a gasket 68 which seals against the flange 69 when the piston is in its uppermost position, thus preventing brake pipe pressure from discharging to and through port 66. Mounted immediately below the emergency actuating piston 64 is the emergency build-up delay piston 70. This piston is normally held in its uppermost position by means of a spring 71 surrounding the stem 72 and in that position a gasket 73 seals against the flange 74, thus isolating the brake cylinder feed port (which, as hereinafter explained, communicates with the space below piston 70) from the space above the piston 70.

It will be observed that the upper face of the piston 70 and the lower face of the piston 64 are exposed to pressure in the same chamber, and they are actuated simultaneously by pressure fluid admitted from the emergency actuation chamber 22 by the emergency control mechanism hereinafter described. The stem 72 is formed with a valve portion 75 which coacts with the valve seat 76, and serves to throttle or close the brake cylinder port which communicates through the valve seat 76. Thus when the piston 70 is forced down, the piston 64 is forced up, and the effect is to prevent the flow of air from the auxiliary reservoir to the brake cylinder and at the same time admit brake pipe air to the brake cylinder. The pressure fluid causing this movement leaks away through the port 67 in a fixed time period determined by the size of port 67, preferably about 7 seconds, whereupon the flow of brake pipe air is cut off and the flow of auxiliary reservoir air is permitted to occur. These functions can be more fully described after the port arrangement has been explained.

The emergency control mechanism mounted in the body 18 includes a cylinder bushing 77 in which works a piston 78. This piston carries a graduating stem 79 and graduating spring 80, the stem colliding with the boss 81 of the lower wall of the emergency control chamber 23. The piston 78 has a stem 82 which positively moves a small riding valve 83 and which shifts by means of lost motion between the shoulders 84 and 85 the main slide valve 86. Generally stated, the piston 78 is actuated by opposed pressures, the upper face being subject to brake pipe pressure and the lower face being subject to pressure in the emergency control chamber 23. When an emergency reduction of pressure occurs, the piston moves up and compresses the graduating spring 80 and through the stem valve mechanisms, to be described, admits air from the emergency actuation chamber 22 to the space between the emergency actuating piston 64 and emergency build-up delay piston 70. If, however, brake pipe pressure is reduced at an ordinary slow service rate, the piston 78 moves up until arrested by the graduating spring, and its valve mechanism serves to vent the emergency actuation chamber 22 and the emergency control chamber 23 conjointly so that their pressure falls at the service rate; that is to say, at substantially the same rate at which brake pipe pressure is falling. In this way the pressure in the emergency control chamber 23 is caused to keep pace with the pressure in the brake pipe, and if for any reason the fall of brake pipe pressure exceeds the service rate, the piston 78 moves up against the action of graduating spring 80 and an emergency application results. Consequently, the emergency application is dependent on the rate of brake pipe reduction and is brought about entirely independently of the movement of the main triple piston 30.

The main mechanisms having now been generally described, it remains to set forth the port arrangements in the body of the device and in the various slide valves. The bushing 24 forms the seat for the main slide valve 38 and contains a number of ports controlled by that valve. The main exhaust port 87 leads directly to a passage 88 in communication with the atmosphere. The port 89 communicates with the port 90 which leads downward to the space 91 beneath the seat 76 of the emergency build-up delay valve 75. The space above the seat 76 communicates by a port 92 with the brake cylinder port 14. From the junction of the ports 14 and 92 there leads a branch port 93 which extends to the brake cylinder port check 62. The two minute ports 94 and 95 both lead to a port 96 which extends downward to the space at the right of the quick service exhaust-opening piston 57. These ports are the means by which pressure is admitted to and exhausted from the space at the right of the quick service exhaust-opening piston 57.

The port 97 leads by way of a port 98 to the reduction chamber 21. The port 99 leads by way of a port 100 both to the equalizing chamber 20 and to the space 48 above the equalizing piston 46, these two spaces being always in communication. The brake pipe is attached at 101 and communicates by means of the port 102 with the space to the left of the triple piston 30. It also communicates by means of the port 103 with the space above the emergency control piston 78. There is a branch port 104 from the port 102 which connects by means of a corresponding port 105 with the space 106 above brake pipe check 60 and with the space 49 beneath equalizing discharge piston 46. The space within the valve bushing 24 communicates by way of a port 107 with the auxiliary reservoir connection 13 and a branch port 108 extends from the port 107 to the seat of the slide valve 86. This valve seat is formed in a bushing 109 in the body 18 and in addition to the port 108 is provided with a port 110 which extends to the space between the emergency actuating piston 64 and the emergency build-up delay piston 70. A port 111 leads from the emergency actuation chamber 22 to the seat of the slide valve 86. An exhaust port 112 also leads from this valve seat to atmosphere.

In order to ensure full releasing control of piston 78 by brake pipe pressure, the port 103 leads to the space above piston 78, and when the piston is in its downward position pressure fluid flows through the feed port 113 through check valve 114 to the space within valve bushing 109, whence it flows by way of the port 115 to the emergency control chamber. When the valve moves to emergency position (see Fig. 7), the piston moves up and cuts off the feed port 113 and at the same time uncovers port 108 so that then the space within the valve bushing 109 is subject to auxiliary reservoir pressure, ensuring a rapid upward movement of piston 78.

These being the ports in the body of the structure, the porting of the main triple valve and its associated graduating valve will next be described. These valves are shown on an enlarged scale in Fig. 9.

There is an exhaust port which has a portion 116 always in communication with the exhaust port 87. It has a small branch 117 which communicates with the port 89 to give retarded release and an adjacent larger branch 118 which also communicates with the port 89 to give full release. There is a further branch of the exhaust port on the lower face at 119 which operates to exhaust the quick service exhaust piston 57 in full service, full service lap and emergency positions. There is an extension 120 of the exhaust port to the top face of the valve which coacts with the grooved port 121 in the graduating valve 37 to effect the venting of the quick service exhaust piston in restricted recharge and release. There is a second extension 122 extending to the top of the slide valve 38 which coacts with the restricted grooved port 123 in the graduating valve 37. This gives a slow exhaust from the reduction chamber 21 in full release position and is the means by which this chamber is gradually bled to atmospheric pressure during release.

There is a through port 124 in the triple slide valve 38 which is controlled by the graduating port 125 in the graduating valve 37. This is the main feed port for air flowing from the auxiliary reservoir to the brake cylinder and it coacts with the brake cylinder port 89. It has a restricted extension 126 at its lower end which gives slow feed in quick service, the registration of the main body of the port with port 89 giving rapid feed in full service and in emergency. There is a quick service piston port 127 in the main slide valve 38 which admits air to the quick service exhaust piston in start to service and in quick service, and vents the quick service exhaust piston in retarded release and recharge. In its pressure-admitting function it is controlled by the port 128 in graduating valve 37. In its venting function it is controlled by the grooved port 121.

Port 129 in slide valve 38 coacts with the port 123, already described, to exhaust the reduction chamber in full recharge and release. The port 130 serves to equalize pressure in the equalizing chamber with the pressure in the reduction chamber during start to service, quick service and full service. It has a further function in both recharge and release positions in which it is controlled by port 131 in graduating valve 37 and is the path of feed to the equalizing chamber. Under the control of port 131 it also allows the pressure in the reduction chamber and the equalizing chamber to equalize with auxiliary reservoir pressure during full service lap (see Fig. 4). Port 132 in slide valve 38 under the control of port 133 in graduating valve 37 controls the charging of the reduction chamber during restricted release and recharge. The action of these two valves can readily be traced in Figs. 1 to 7 inclusive.

Referring now to the slide valves 83 and 86 which are shown on an enlarged scale in Fig. 9, it will be observed that the riding slide valve 83 is provided with a single through port 134. This serves in start to service, quick service and full service positions to connect the interior of the valve chamber to the port 135, and through the port 135 and port 112 to atmosphere. In both release positions and in full service lap position the port 134 is out of registry with the port 135 and in emergency positions the port 135 is out of registry with port 112. The slide valve 86 has in its left face a grooved port 136 which functions in emergency position to connect ports 110 and 111 and thus permit pressure fluid to flow from the emergency actuation chamber to act upon the emergency actuating piston 64 and the emergency build-up delay piston 70. There is a through port 137 in valve 86 which is not controlled by the riding slide valve 83 and which in all positions except emergency, when it is moved out of register, connects the emergency actuation chamber with the space within valve bushing 109.

In certain classes of equipment the delayed build up in emergency may not be desired. In such case cylinder body 44 and cap 45 with their enclosed parts, namely the piston 70 with its stem 72, valve 75, and spring 71, may be omitted. In lieu of these parts a cap 140 may be substituted, seating on the body 43 in the place of the cylinder body 44 (see Fig. 8). This cap 140 is supplied with a loop port 141 which simply connects the ports 90 and 92. The effect is obvious. Since the flow from the auxiliary reservoir to the brake cylinder in emergency is entirely unobstructed, it will commence concurrently, or substantially so, with the flow from the brake pipe to the brake cylinder. Since the valve 75 functions only in emergency applications, the substitution of the cap 140 involves no change in the operation of the device except in its emergency application function.

The operation of the valve will now be traced with reference to its various functions.

*Full recharge and release, Fig. 1.*—This is the action which takes in release position in all triple valves in a train except those on one or more cars at the front of the train, where the releasing pressure rise is quite severe. The triple piston 30 is arrested by the retard stop 32 without compression of the spring 33. Air flows from the brake pipe through the connection 101 and port 102 to the interior of the front cap 27 and thence via the charging port 26 to the space within the valve bushing 24. Thence it flows by port 107 to the auxiliary reservoir and also (via port 108) to the seat of the emergency control valve 86, where its flow is arrested. At the same time air flows from port 101 by way of port 103 and thence through the space above the emergency control piston via feed port 113 and check valve 114 to the space below the control piston 78, from which it flows by way of port 115 to the emergency control chamber 23. At the same time flow occurs through the port 137 in valve 86 to port 111, and thence to emergency actuation chamber 22. Thus chambers 20, 22 and 23 are all charged to brake pipe pressure. At the same time air flows from the brake pipe connection 101 through port 102 and ports 104 and 105 to the space 106 above the brake pipe check 60 and into the space 49 beneath equalizing piston 46. The space 48 above this piston is in communication with equalizing chamber 20 by way of port 100. Consequently, pressures in the spaces 48 and 49 above and below piston 46 are substantially equalized, and equalizing discharge valve 50 tends to remain closed.

However, even should valve 50 open, no discharge from the brake pipe would occur for the reason that the check 54 is closed. This follows from the fact that the space to the right of the piston 57 is vented to atmosphere by way of ports 96, 94, 116, 87 and 88. The brake cylinder is connected to atmosphere by way of ports 14, 92, 90, 89, 118, 116, 87 and 88. During the preceding application reduction chamber 21 was charged to some pressure higher than atmospheric, and this pressure is vented slowly to the atmosphere by way of ports 98, 97, 129, restriction port 123, ports 122, 116, 87, and 88. Consequently, brake cylinder pressure is freely released and the pressure in the reduction chamber 21 falls gradually to atmospheric.

*Restricted release and recharge, Fig. 2.*—This is the position assumed by the valves on a few cars at the front end of the train and is caused by a heavy rise of brake pipe pressure. Here the triple piston 30 is moved to its extreme right hand position, forcing back retard stop 32 against the action of the spring 33. The flow to the auxiliary reservoir is choked, since it must pass through the restricted port 42 on the right hand face of piston 30. Thus the auxiliary reservoir, the equalizing chamber 20, the emergency control chamber 23, and the emergency actuation chamber 22 are all charged with brake pipe pressure, but at a much slower rate.

The reduction chamber 21, instead of being discharged to atmosphere at a slow rate, is connected to the space within the slide valve bushing 24 by means of ports 133, 132, 97 and 98. Thus the pressure in the reduction chamber 21 equalizes with the pressure in the other chambers just mentioned.

At the same time the registration of restricted port 117 in the slide valve with the port 89 in the slide valve bushing gives a restricted release of brake cylinder pressure.

The space 49 beneath piston 46 is in direct communication with the brake pipe by means of the ports 101, 102, 104 and 105. Since the feed through the port 42 is restricted, the pressure in the space 49 below the piston 46 is greater than the pressure in the space 48 above the piston, so that valve 50 opens, but the check valve 54 prevents any venting of brake pipe pressure, since, as before, the space at the right of piston 57 is connected with the atmosphere. Consequently, in the restricted release and recharge position the brake cylinder is exhausted slowly, the auxiliary reservoir and the chambers 20, 22 and 23 are charged at a correspondingly slow rate, while the reduction chamber 21 is charged to a pressure which tends ordinarily to become equal with brake pipe pressure.

*Start to service, Fig. 3.*—When the service reduction of pressure commences in the brake pipe, the triple piston starts to move to service position, and as it moves, it passes through the position shown in Fig. 3. Just as the exhaust from the brake cylinder is cut off and just as the feed of pressure fluid from the auxiliary reservoir to the brake cylinder is about to begin, the port 130 bridges the ports 97 and 99, producing an equalization of pressure between the equalizing chamber 20 and the reduction chamber 21.

After a normal recharge, such as has been described with reference to Fig. 1, the reduction chamber would be at atmospheric pressure, and consequently as a result of the relative proportions of these chambers the pressures in chambers 21 and 20 would equalize at a pressure of approximately seven pounds below equalizing chamber (i. e., auxiliary reservoir) pressure. Since chamber 20 is always in communication with space 48 above piston 46, this piston rises. At the same time port 127 registers with port 94 and also with port 128, so that auxiliary reservoir air flows by way of ports 94 and 96 to the space at the right of the piston 57, forcing this piston to the left so that gasket 58 seats, and valve 54 is opened. This results in local venting of the brake pipe via ports 101, 102, 104, 105, space 49, bushing 52, port 53, valve 54, port 56, to atmosphere.

The same action would occur after restricted recharge and release provided the triple valve had returned to full release position and had remained there long enough to reduce the pressure in reduction chamber 21 to atmospheric pressure.

If, however, the start to service occurred immediately after a restricted recharge, then the reduction chamber 21 would be charged to some pressure higher than atmospheric, and in extreme cases, to the same pressure as chamber 20. In the last named case, the connection of chambers 20 and 21 would produce no drop in pressure above the piston 46, and this would not rise to open the valve 50, although the valve 54 would be held open by the means already described. Hence no brake pipe venting whatever would occur.

Similarly, if the reduction chamber 21 were charged to some pressure higher than atmospheric and lower than the pressure in the chamber 20, a reduction in pressure would occur, but it would be less than in the case where the reduction chamber 21 is at atmospheric pressure. Consequently, the valve 50 would open, but would close again, as soon as brake pipe pressure was reduced an amount corresponding to the drop produced by the connection of chambers 20 and 21. This means that in a start to service, following retarded recharge in a particular triple valve, the local brake pipe venting on that valve would be shorter in duration than after a normal release and recharge, and commonly would not occur at all. It follows that in the case of an undesired re-application, occurring because of overcharged reservoirs when the engineer's brake valve is moved to running position, the brake-applying tendency would not be accentuated by local venting of the brake pipe. If it occurred at all, it would quickly terminate, and would commonly terminate before brake pipe pressure was reduced below the normal brake pipe pressure for running condition.

It will also be observed that in the start to service, the emergency control piston 78 moves up, cutting off the feed port 113 and so registering ports 137 and 135 in the slide valve, and port 134 in the riding valve, that chambers 22 and 23 are vented to atmosphere at a restricted rate, the ports being so designed that this rate corresponds to a normal service reduction rate of brake pipe pressure. This occurs whenever start to service is made.

In case an undesired re-application occurs, it can be released by a flash movement of the engineer's brake valve to release position, which will restore the triple piston 30 to full release position in which the quick venting function of the valves at the front end of the train is slowly restored.

In the case of a normal application, the start to service causes local venting of the brake pipe which serves to accelerate the propagation of the drop of pressure throughout the length of the brake pipe. This causes all the valves to move to quick service position in rapid sequence throughout the train.

*Quick service position, Fig. 4.*—In this position the piston is arrested by the graduating stem, and the extension 126 from port 124 starts a restricted feed of auxiliary reservoir pressure by way of ports 125, 124, 126, 89, 90, 92 and 14, to the brake cylinder. Piston 46 remains in its upward postion, continuing the local exhaust of brake pipe air until the brake pipe pressure is reduced to a point at which it falls slightly below the equalized pressure in chambers 20 and 21. At this point graduating valve 50 must close. Under these conditions piston 78 remains arrested by graduating stem 79 and spring 80, and so long as the reduction of brake pipe pressure does not exceed the service reduction rate, piston 78 moves no further.

*Full service position, Fig. 5.*—If when the triple valve has reached quick service position (Fig. 4), brake pipe reduction continues, and at such a rapid rate that it exceeds the rate of reduction of auxiliary reservoir pressure, the triple piston will move to full service position against the resistance of graduating spring 29. In this position auxiliary reservoir air flows freely to the brake cylinder through ports 125, 124, 89, 90, 92 and 14. At the same time, the space to the right of the piston 57 is vented to atmosphere through ports 96, 95, 119, 116, 87 and 88, thus terminating the local exhaust of brake pipe pressure regardless of the position of piston 46. Under these conditions, assuming the rate of brake pipe pressure reduction does not exceed the service rate, piston 78 remains arrested by its graduating spring. Thus brake cylinder pressure builds up until equalization of auxiliary reservoir and brake cylinder pressures occurs. Upon such equalization, the graduating spring 29 will shift the triple piston 30 to full service lap. At or about the same time, piston 78 will descend to its lower position, cutting off the venting of pressure from the chambers 22 and 23. This places the parts in full service lap position.

*Full service lap position, Fig. 6.*—In this position the graduating valve 37 has moved to the right, moving the port 125 out of register with the port 124, and thus isolating the auxiliary reservoir from the brake cylinder. The movement of the piston 78 terminates the venting of pressure from chambers 22 and 23.

It will be observed that in start to service, quick service, and full service, the emergency actuation chamber 22 and the emergency control chamber 23 are vented to atmosphere through the ports 111, 137, 134, 135 and 112, and that this rate of venting is commensurate with the maximum desired rate of brake pipe reduction for a service application.

Suppose now that the brake pipe pressure is reduced at an emergency rate when the triple valve is in either of its release positions or in either start to service, quick service, full service or lap position. Obviously the effect is to move the parts to emergency position.

*Emergency position, Fig. 7.*—Here the triple piston 30 has moved to its extreme left position and seats against the gasket, but at the same time the piston 78 has moved to its extreme upward position against the resistance of its graduating spring 80. Port 108 immediately feeds auxiliary reservoir air to the space below piston 78, and hence to the interior of slide valve bushing 109 and to the emergency control chamber 23. At the same time air from the emergency actuation chamber 22 flows by way of port 111, port 136, and port 110 to the space between pistons 64 and 70, forcing piston 64 to its extreme upward position and piston 70 to its extreme downward position. Piston 64 unseats valve 60 and brake pipe air flows by way of connection 101, port 102, port 104, port 105, space 106, check valve 62, port 93, port 14, to the brake cylinder, thus quickly venting the brake pipe into the brake cylinder.

Simultaneously valve 75 closes the port in seat 76 and prevents or throttles, according to the design of the valve, the flow of auxiliary reservoir air to the brake cylinder, which would otherwise occur through ports 125, 124, 89, 90, space 91, valve seat 76, port 92, and port 14. The pressure fluid discharged from the emergency actuation chamber 22 will be bled away through port 67 in piston 64, and thence through atmospheric port 66. The time of such bleeding down may be set by choosing an appropriate size for port 67, but in trains of the present length the time should be about seven seconds, which is the time required for all valves in the train to respond to the emergency pressure drop. At the termination of this period, piston 64 will move downward, closing valve 60, and piston 70 will rise, opening valve 75. When this occurs, the flow of brake pipe air to the brake cylinder is terminated and the flow of auxiliary reservoir air to the brake cylinder commences. The seven second period is sufficient to permit the slack to run in, thus precluding damage to the rolling stock and lading by the sudden shock of a full emergency application.

If the valves are equipped with the special structure shown in Fig. 8, then the throttling of the pressure flow from the auxiliary reservoir to the brake cylinder does not occur, but otherwise the functions are the same except that valve 62 will close when brake cylinder pressure approaches equalization with brake pipe pressure.

From the above discussion of operation it will be seen that the emergency function is entirely under the control of the piston 78 and is determined by the rate of brake pipe pressure reduction, irrespective of the movement of the triple piston 30. Furthermore, the local brake pipe venting in quick service is automatically suspended, in whole or in part, upon the movement of the triple valve piston to restricted recharge position, and is gradually restored by the movement of such piston back to full release position. It follows that such re-applications as may occur because of overcharged reservoirs are not accompanied by local venting of the brake pipe. Consequently, the local vent ports need not be restricted in their capacity, and the quick serial action feature in service need not be curtailed.

It will be observed that in start to service, quick service, full service and emergency positions the actuation chamber is slowly bled to atmosphere, the pressure in this chamber falling concurrently with the pressure in the emergency control chamber at a rate corresponding to a service reduction of brake pipe pressure. Consequently, if an emergency application is made after a service application, the quantity of air in the emergency actuation chamber 22 is less than in the case when the emergency application is made from one of the release positions. The purpose is to secure a proper timing of the flow of brake pipe air to the brake cylinder, and similarly a proper timing of the delay in build-up of brake cylinder pressure.

Where a service application has already been made and an emergency application follows, brake pipe pressure will equalize with brake cylinder pressure much more quickly, and hence it is desirable that the brake pipe check 60 close sooner. Obviously, since the emergency actuation chamber 22 contains a less quantity of pressure fluid, this will bleed away more quickly through the restricted port 67, and consequently valves 60 and 75 will close more quickly than they do in the case of an emergency application made from release position. In other words, the flow of brake pipe air is cut off more quickly and the flow of auxiliary air is delayed for a shorter period in cases where the brake cylinder is already under pressure. Thus, although the emergency valve mechanism is distinct from the main triple valve mechanism, its action is properly co-ordinated with the action of the main triple valve.

Obviously various departures may be made from the specific structure and we do not limit ourselves except to the extent specified in the following claims.

What is claimed is:

1. The method of minimizing the undesired reapplication of brakes controlled by quick acting triple valves having local brake pipe vents opening in service which consists in suspending the function of the brake pipe vent as an incident to overcharging of the corresponding auxiliary reservoir.

2. The method of minimizing the undesired reapplication of brakes controlled by quick acting triple valves having local brake pipe vents opening in service which consists in suspending the function of said brake pipe vent as an incident to overcharging of the corresponding auxiliary reservoir, and maintaining said suspension of function while such overcharge persists.

3. The method of minimizing undesired reapplications of automatic air brakes in systems having triple valves provided with quick action brake pipe vents opening in service, which consists in subjecting the action of said vents to secondary control by the releasing pressure in the brake pipe, in such manner that excessive releasing pressure in any triple valve suspends the action of its vent in an ensuing service application.

4. The method of minimizing undesired reapplication of automatic air brakes in systems having triple valves provided with quick action brake pipe vents opening in service which consists in subjecting the action of said vents to secondary control by the releasing pressure in the brake pipe in such manner that excessive releasing pressure in any triple valve suspends or reduces the action of its vent in an ensuing service application, and the restoration of normal running brake pipe pressure restores said vent to active condition.

5. The combination of a triple valve provided with means for restricting upon undue rise of brake pipe pressure, the recharge of the auxiliary reservoir, and provided with a brake pipe vent operable in service position; of means conditioned as an incident to such restricted recharge to suspend the action of said vent when the valve thereafter moves to service application position.

6. The combination of a triple valve provided with means for restricting upon undue rise of brake pipe pressure the recharge of the auxiliary reservoir, and provided with a brake pipe vent open in service position; of means conditioned as an incident to such restricted recharge to suspend the action of said vent when the valve threafter moves to service application position; and means operative in full recharge position to restore said suspending means gradually to inactive condition.

7. The combination with a triple valve having means for venting the brake pipe in service application position; of means operatively conditioned by abnormal releasing pressure in the brake pipe, and when so conditioned serving to close said local vent in an ensuing service application.

8. The combination with a triple valve having means for venting the brake pipe in service application position; of means operatively conditioned by abnormal releasing pressure in the brake pipe, and when so conditioned serving to close said local vent in an ensuing service application; and means operated by the restoration of normal running pressure in the brake pipe and serving gradually to restore said vent-closing means to normal inactive condition.

9. The combination with a triple valve having a local brake pipe vent open in service position and having two release positions, one of which is assumed under normal releasing conditions, and other of which is assumed under conditions tending to produce overcharge of the auxiliary reservoirs; of means put into active condition in the last named releasing position and when so conditioned serving to prevent the opening of said local vent in a service application following such a releasing action.

10. The combination with a triple valve having a local brake pipe vent open in service position and having two release positions, one of which is assumed under normal releasing conditions and the other of which is assumed under conditions tending to produce overcharge of auxiliary reservoirs; of means put into active condition in the last named releasing position, and when so conditioned serving to prevent the opening of said local vent in a service application following such releasing action; and means active in normal releasing position serving gradually to restore said vent-preventing means to its normal inactive condition.

11. The combination with a triple valve of the type characterized by restricted recharge under undue releasing pressure in the brake pipe, and by venting of the brake pipe in service; of a pressure-actuated valve controlling the service brake pipe vent; and a reservoir connected to be charged in restricted release position and when so charged, acting upon said pressure-actuated valve in an ensuing service application to close said valve and prevent local venting of the brake pipe.

12. The combination with a triple valve of the type characterized by restricted recharge under undue releasing pressure in the brake pipe and by venting of the brake pipe in service; of a pressure-actuated valve controlling the service brake pipe vent; a reservoir connected to be charged in restricted release position and when so charged, acting upon said pressure-actuated valve in an ensuing service application to close said valve and prevent local venting of the brake pipe; and means operative in the normal recharge position of the triple valve serving slowly to vent said reservoir.

13. The combination with a triple valve of the type characterized by restricted recharge under undue releasing pressure in the brake pipe and by venting of the brake pipe in service; of a pressure-actuated valve controlling the service brake pipe vent; a reservoir connected to be charged in restricted release position and when so charged, acting upon said pressure-actuated valve in an ensuing service application to close said valve and prevent local venting of the brake pipe; means operative in the normal recharge position of the triple valve serving slowly to vent said reservoir; and means controlled by the triple valve, and controlling the service brake pipe vent, arranged to permit said vent to be open in ordinary service functions, but to close it in full service position of the triple valve.

14. The combination with a triple valve characterized by restricted recharge upon undue releasing pressure in the brake pipe and by venting of the brake pipe in service; of a pressure-actuated valve exerting a secondary control on said brake pipe vent; an equalizing chamber charged to auxiliary reservoir pressure in all release positions; a reduction chamber vented to atmosphere in normal release position and charged with pressure fluid in restricted release position; and ports controlled by the triple valve and opened thereby as the valve starts to service, to connect said chambers with each other and with the pressure-actuated element of said valve to control the same.

15. A triple valve comprising in combination a casing; a piston; a slide valve and associated graduating valve actuated by said piston to control admission of air to and its exhaust from the brake cylinder; a brake pipe vent under the control of said slide valve and serving to vent air from the brake pipe as the slide valve moves from release to service position; a resilient retard stop tending to arrest the piston in full recharge and release position, but permitting it to move under excessive releasing pressure in the brake pipe to a restricted recharge position; a chamber charged concurrently with the auxiliary reservoir in both full recharge and restricted recharge positions; a second chamber so controlled by the slide valve that it is slowly vented to atmosphere in full recharge position and is charged concurrently with the auxiliary reservoir in restricted recharge position; a pressure-actuated valve exerting a secondary control on said brake pipe vent and urged in an opening direction by brake pipe pressure; and means controlled by said slide valve serving as the latter moves from release toward service position to connect said two chambers together and direct their equalized pressure against said pressure-actuated valve in opposition to brake pipe pressure.

16. A triple valve comprising in combination a casing; a piston; a slide valve and associated graduating valve actuated by said piston to control admission of air to and its exhaust from the brake cylinder; a brake pipe vent normally closed by an inward opening check valve; a piston subject to pressure controlled by said slide valve and arranged to open said check valve as the slide valve moves to and until it reaches full service position; a resilient retard stop tending to arrest the piston in full recharge and release position, but permitting it to move under excessive releasing pressure in the brake pipe to a restricted recharge position; a chamber charged concurrently with the auxiliary reservoir in both full recharge and restricted recharge positions; a second chamber so controlled by said slide valve that it is slowly vented to atmosphere in full release position, and is charged concurrently with the auxiliary reservoir in restricted recharge position; a pressure-actuated valve exerting a secondary control on said brake pipe vent and urged in an opening direction by brake pipe pressure; and means controlled by said slide valve serving as the latter moves from release toward service position to connect said two chambers together and direct their equalized pressure against said pressure-actuated valve in opposition to brake pipe pressure.

17. The combination with a triple valve device of the restricted recharge type having full and restricted recharge positions in which release occurs, and having a slide valve controlling admission of auxiliary reservoir air to and its release from the brake cylinder, of two piston actuated valves arranged in series and controlling a brake pipe vent, one of said piston-actuated valves being opened by pressure fluid controlled by the slide valve as the slide valve moves from release toward full service position, and the second of said piston-actuated valves being urged open by brake pipe pressure; and means controlled by said slide valve for accumulating air in characteristically different quantities in full and in restricted release positions respectively, and for expanding said air to a fixed volume and causing it to act on the second piston-actuated valve in opposition to brake pipe pressure, as the triple valve moves from release toward full service position.

18. The combination with a triple valve device of the restricted recharge type having full and restricted recharge positions in which release occurs, and having a slide valve controlling admission of auxiliary reservoir air to and its release from the brake cylinder, of two piston-actuated valves arranged in series and controlling a brake pipe vent, one of said piston-actuated valves being opened by pressure fluid controlled by the slide valve as the slide valve moves from release toward full service position, and the second of said piston-actuated valves being urged open by brake pipe pressure; means controlled by said slide valve for accumulating air at brake pipe pressure in both recharge positions, the quantity accumulated in restricted recharge being greater than in full recharge; means controlled by said slide valve for slowly venting the excess of stored air when the valve remains in full recharge position after restricted recharge; and means controlled by said slide valve for expanding the accumulated air to a constant volume and causing it to act on the second piston-actuated valve in opposition to brake pipe pressure as the triple valve moves from release toward full service position.

In testimony whereof we have signed our names to this specification.

BLYTHE J. MINNIER.
CHAS. A. CAMPBELL.